United States Patent
Symaniec et al.

[11] 3,732,565
[45] Feb. 20, 1973

[54] SPECTRUM ANALYSIS SYSTEMS USING OPTICAL CORRELATION TECHNIQUES PARTICULARLY USEFUL IN PULSE MODULATED DOPPLER RADAR SYSTEMS

[75] Inventors: Leonides Symaniec; Christian Pepin; Claude Skenderoff, all of Paris, France

[73] Assignee: Thomson-CSF, Paris, France

[22] Filed: July 23, 1971

[21] Appl. No.: 165,529

[30] Foreign Application Priority Data

July 23, 1970 France..............................70,27248

[52] U.S. Cl......................343/9, 235/181, 324/77 K, 343/100 CL
[51] Int. Cl...............................................G01s 9/44
[58] Field of Search..............343/7.3, 8, 9, 100 CL; 235/181; 324/77 K, 79 R

[56] References Cited
UNITED STATES PATENTS

| | | | |
|---|---|---|---|
| 2,834,956 | 5/1958 | Harris | 343/100 CL |
| 3,483,557 | 12/1969 | Skenderoff et al. | 343/9 |

*Primary Examiner*—Stephen C. Bentley
*Attorney*—George B. Oujevold

[57] ABSTRACT

System of spectrum analysis using optical correlation in real time with non-coherent light, comprising a moving plan with tracks, each track representing a frequency corresponding to the central frequency of a sample of the spectrum analyzed considered displaced in frequency by a predetermined frequency value $\Delta F$. Transducer means convert the signal which frequencies are within the spectrum to be analyzed, into an optical modulated beam; photocell receivers in a correlation plane are followed by identical filters centered on $\Delta F$ and having a band corresponding to the width of a sample. The filter is followed by a detection circuit. The invention is particularly applicable to a pulse Doppler radar system.

5 Claims, 5 Drawing Figures

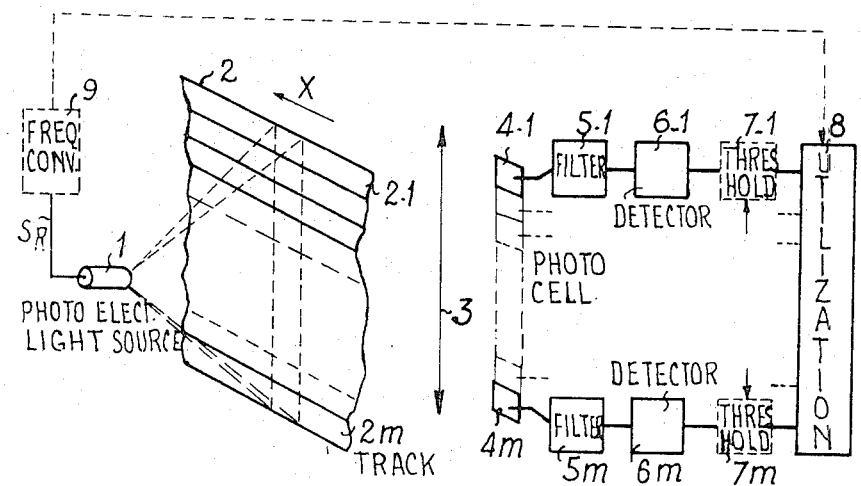
Fig.1.
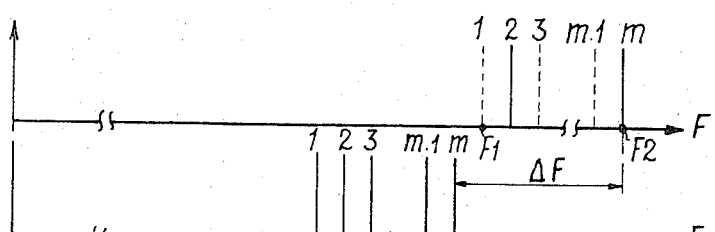
Fig.2a.
Fig.2b.
Fig.2c.
Fig.2d.
Fig.2e.
Fig.2f.

SPECTRUM ANALYSIS SYSTEMS USING OPTICAL CORRELATION TECHNIQUES PARTICULARLY USEFUL IN PULSE MODULATED DOPPLER RADAR SYSTEMS

BACKGROUND OF THE INVENTION

The present invention relates to improvements in spectrum analyzer systems, using optical correlation, in real time, with non-coherent light. More particularly, a spectrum analyzer according to the present invention is advantageously applicable in practice to pulse Doppler radar receivers.

BRIEF DESCRIPTION OF THE PRIOR ART

The pulse Doppler radar is a form of MTI Radar applied principally to radar systems requiring the detection of moving targets in a ground clutter environment. These radar systems have a PRF (Pulse Repetition Frequency) sufficiently high that there are no velocity ambiguities for either clutter or targets of interest, they perform Doppler (i.e., frequency domain) filtering on a single spectral line of pulse spectrum.

The receiver includes multiple range gates, each followed by clutter rejection filter means and Doppler filter means. The received signal is then detected, integrated and applied to a threshold circuit. The outputs of the threshold detectors are properly combined for display on a PPI or A-scope, or for any other appropriate indicating or data-processing device.

This type of radar deals with the detection of moving targets, such as low-altitude flying aircraft, taking into consideration that the ratio of ground clutter echos to moving target echoes can attain about 60dB. Under these conditions protection against stationary echoes cannot readily be obtained with simple Doppler filters, except by complex technological solutions, which almost cannot be carried out into practice. Furthermore, each range channel is followed with a battery of Doppler filters. The cost and volume of the range Doppler selection channels increase considerably as the capabilities of radar resolution is increased.

To remedy the drawbacks of electronic solutions, this improvement consists in using optical correlation in real time with non-coherent light. With such an arrangement it is possible to work with a low volume level signal in the range Doppler selection. This type of correlating radar system generally proceeds by sequential treatment of the optical signals correlated and integrated on a photoreceiving screen of a vidicon tube, or an equivalent device, or on a mosaic formed by photodiodes. The sequential analysis is a disadvantage since the signals reflected by a mobile target during the time period of its illumination by the antenna radiation pattern, which time period is generally taken as the integration time, is usually divided into two successive periods. The sequential treatment therefore produces a sampling of the field explored by the antenna, generally as an azimuth scan. As a result, detection conditions vary in accordance with the angular location of the illuminated target from the central axis of the corresponding sample of space, the optimum detection conditions being the situation where the target is centered right on the axis, and the most unfavorable conditions being away from said axis by the maximum angle. In this last cited case, the reflected signals are shared alike in two succeeding time periods and the level of the correlated data during each time period may not be sufficient to detect the mobile target considered.

A pulse Doppler radar system of the optical correlation type is described in U.S. Pat. No. 3,483,557 to Compagnie Francaise Thomson Houston - Hotchkiss Brandt. In this apparatus, there is a double correlator device; one for range selection, the second for the Doppler selection by spectrum analysis, the filtering of ground clutter echoes taking place intermediately after an opto-electrical conversion of the range selected signals. The resulting system is very complex and reduces reliability and the radar performance, in addition to the drawbacks hereinbefore mentioned.

SUMMARY OF THE INVENTION

Accordingly, the object of the present invention is to provide a spectrum analysis system which, when applied to a pulse Doppler radar, remedies the aforementioned defects, and does not require a sequential analysis is not required.

According to one feature of the invention, the spectrum analyzer herein contemplated (insuring Doppler selection, if applied to a pulse Doppler radar) comprises, a dynamic optical correlator proceeding in real time with non-coherent light having reference tracks which define a plurality of distinct frequencies, resulting from the sampling of the spectrum to be analyzed considered displaced by a determined frequency value $\Delta F$. Optical photocells are associated with said tracks, each connected to an identical selective filter having a central frequency corresponding to said predetermined frequency value $\Delta F$, and having a passing bandwidth equal to the width of a sample of said spectrum.

The invention, as well as other objects and advantages thereof, will become more readily apparent from the following detailed description given as an example, and not in limitation, when taken together with the accompanying drawings, in which:

BRIEF DESCRIPTION OF THE DRAWINGS

FIG. 1 is a simplified schematic diagram of a spectrum analyzer according to the present invention;

FIGS. 2a to 2f show wave forms relating to the operation of a spectrum analyzer according to the present invention;

DETAILED DESCRIPTION

Figure 3A:
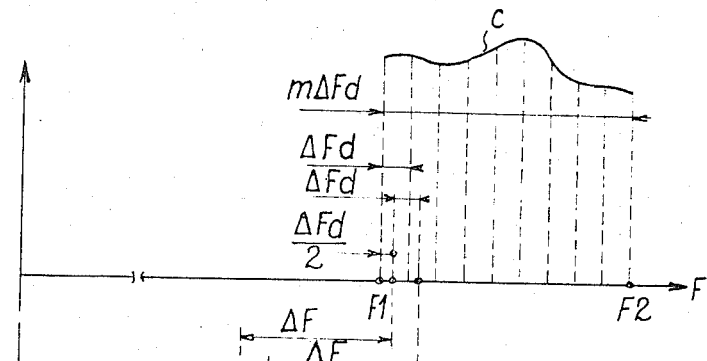
FIGS. 3a to 3c show wave forms relating to the operation of a spectrum analyzer according to the present invention when applied to a pulse Doppler radar receiver.

FIG. 1 represents a simplified, schematic diagram of a spectrum analyzer according to the inventive concept, which comprises an optical correlator proceeding in real time with non-coherent light which includes a light source 1, a moving plan 2, supporting tracks corresponding to reference functions, an optical objective 3, and photocell receivers 4. Light source 1 converts variations in the time of the function which is to be correlated in the form of a non coherent light beam modulated in intensity. Since the signal to be analyzed $S_R$ is generally available in some electrical form, source 1 is an electrooptical transducer of the photo-emissive type, such as an electroluminescent diode. The optical correlator is of the dynamic type, and, by means (not shown) there is a uniform displacement of the support 2 along the travel path defined by its plane. Other optical means (not shown) associate with the source 1 and enable it to illuminate the plan with a pencil beam of a determined thin width and projected perpendicularly to the tracks 2-1 to 2-$m$. Plane support 2 has a plurality $m$ of parallel juxtaposed tracks 2-1, etc., which translate in variable transparency, parallel reference signal functions. These reference functions are preferably rendered in digital form so as to be converted optically by transparencies into zero or one. The tracks are parallel to the X direction in the case of a rotating drum or concentric in the case of a rotating disk. According to the inventive concept, the correlation plan comprises a range of opto-electric transducers such as photo-receptive diodes. There are $m$ such diodes (or an integer multiple thereof) corresponding respectively to tracks 2-1 to 2-$m$. The diodes are spatially disposed in a manner corresponding to the tracks so as to separately receive the optical correlation products between signal $S_R$ to be analyzed and the reference signal provided by the corresponding associated track.

These optical correlators are particularly useful in radar applications to make a Doppler selection of the received signals. The reference signals carried by the tracks of the moving support 2 generally correspond to a same number of replicas of the received signal $S_R$, affected differently by a certain amount of Doppler shift determined by sampling of the whole Doppler band previously considered to be explored.

In an apparatus according to the present invention, the reference signals are further regularly displaced in frequency by an amount $+\Delta F$ (or $-\Delta F$) which is identical in amplitude and polarization for each of them. In this manner, the correlation product of a light ray having a frequency F of the signal $S_R$ with the corresponding track having the frequency F displaced by $\Delta F$ produces a beat frequency of a value $\Delta F$ which can be filtered. The product obtained by correlating this one light ray and other tracks, provides a component of value different from $\Delta F$, modified by the amounts of relative difference Doppler shift between the one said track and each of said other tracks considered and this component can be eliminated by selective filtering centered on the value $\Delta F$.

More particularly, assume, as shown in FIG. 2$a$, that a signal $S_R$ which is to be analyzed, has a frequency included in the band of the spectrum analyzed going from $F_1$ to $F_2$. To simplify the explanation, it will be understood that the different spectral rays shown between $F_1$ and $F_2$ correspond to different stepped successive values between $F_1$ and $F_2$ and that they are of equal amplitude. FIG. 2$b$ represents the spectrum of frequencies corresponding to those provided by the tracks, displaced respectively by $\Delta F$ from the line of ray 2A.

A negative displacement $\Delta F$ has preferably been adopted since it allows more readily the production on the film of the plan 2 of lower frequencies order than those analyzed. FIGS. 2$c$, 2$d$, 2$e$ show useful components of the correlation products situated around the value $\Delta F$ and limited for example to the tracks converting frequencies of Doppler channels of the order 1, 2 and $m$. In each case only one ray is located which will provide the value $\Delta F$ produced by correlating with a reference function of the same order. Consequently, selective filtering centered around $\Delta F$, as shown in FIG. 2F permits identification of the presence of the spectral corresponding ray in the signal $S_R$, which is being analyzed. Assuming, as stated, that the signal $S_R$ provides in frequency band $F_1 - F_2$, only rays of the order of 2 and $m$, then only the corresponding photoreceiving diodes will deliver an output of the value $\Delta F$, indicating the presence of these rays in the signal to be analyzed (FIGS. 2d and 2e).

Each photocell, such as 4-1, feeds a selective filter 5-1, followed by a detection circuit 6-1. The filters 5-$1$ to 5-$m$ are identical, they are centered on the frequency $\Delta F$ and have a width sufficiently narrow to attenuate the nearest side frequencies, namely $\Delta F \pm (F_2 - F_1/m)$ in the case in point. Each detection circuit 6-1 to 6-$m$ comprises a detector rectifier followed by a resistance-capacitance cell. The output of the detector circuits 6-1 to 6-$m$ can be applied directly to an utilization unit 8 if the processing data is analog. An output signal from a channel representing simultaneously the presence of a particular ray in the spectrum to be analyzed as well as its amplitude is provided. If it is desired to provide a digital process to the output, i.e., recover only information as to the presence or absence of the different spectrum rays to be analyzed, amplitude threshold circuit 7, comparing to a predetermined level, can be interposed between detector circuits 6-1, etc., and the utilization unit 8. The electronic circuits 5-1, 6-1, etc., or 5-1, 6-1, 7-1, etc. are connected behind the photocells 4-1, etc., and are identical for each Doppler channel.

An increase in the number of tracks makes it possible to increase the extent of the spectrum analyzed. However, technological considerations render it necessary to limit the number of tracks. The study of a more extended spectrum can thus be assured by means of a frequency transposition circuit 9 which filters the signal to be analyzed in such a manner as to cover the entire spectrum of the signal in successive portions of a width equal to $F_2 - F_1$. In utilizing the results, the amount of the corresponding frequency transposition applied successively to the signal must be born in mind. Frequency transposition and filtering circuits 9 are achieved by techniques known in the art.

Figure 3B:
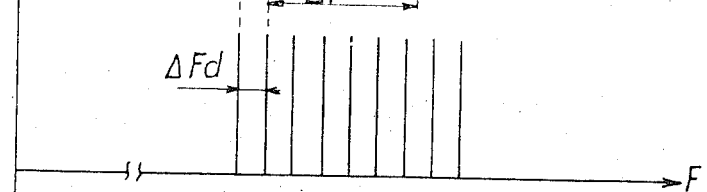
Figure 3C:
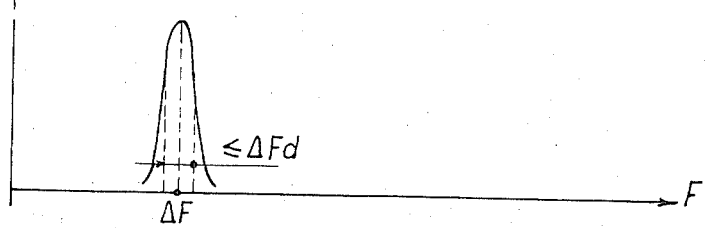

For many applications, particularly in the case of Doppler radar, it is not necessary to separately identify all the frequencies included in the given frequency band $F_2 - F_1$, but only to localize the presence of the rays corresponding to the central frequency of the elementary bands resulting from the sampling of the total band. The total bandwidth, as shown in FIG. 3$a$, is divided into $m$ elementary bands of the same width $\Delta F_d = (F_2 - F_1/m)$ and the respective tracks correspond to the respective central frequencies of said elementary bands, displaced each in frequency by $\Delta F$, as shown in FIG. 3$b$. For example, track 2 is responsive to the frequency $[F_1 + (3/2) \Delta F_d] - \Delta F$. The selective filters 5 can have a maximum bandwidth at 3 dB corresponding to the width $\Delta F_d$ of a sample;, shown in FIG. 3c.

A spectrum analyzer according to the present invention allows an analysis with an accurate discrimination of the frequency rays. This discrimination depends upon the nature and duration of the applied signal $S_R$. The localizing of the spectrum analysis $F_1$ to $F_2$ is preferably determined so as to obtain a central frequency $\Delta F$ and reference frequencies located in the low frequency domain. Thus, the reproduction of the reference frequencies on the tracks is easily achieved with great precision, and the filters 5-1, 5-m may be manufactured easily with a low cost.

The difference in frequency $\Delta F$, preferably has a negative value; its minimum value being at least equal to the width $F_2 - F_1$ of the spectrum field analyzed. For example, the spectrum analyzer can be between $F_1$ and $2F_1$ and the frequency displacement $\Delta F$ equal to $F_1$.

The frequency displacement $\Delta F$ of the tracks allows relatively to the known systems having a null displacement, detection to properly place the results of correlation between signal light rays to be analyzed and tracks of the same order on the frequency $\Delta F$, instead of placing this result on the zero frequency position. This is rather important since the signal at the output of selective filtering is almost free of parasitic continuous components produced notably by the optical correlation. These components act principally on the amplitude of the correlation product in the prior art. The sensibility and reliability of the system of analysis is such improved.

These characteristics make the application of this system particularly useful in a pulse Doppler radar system.

Figure 4:
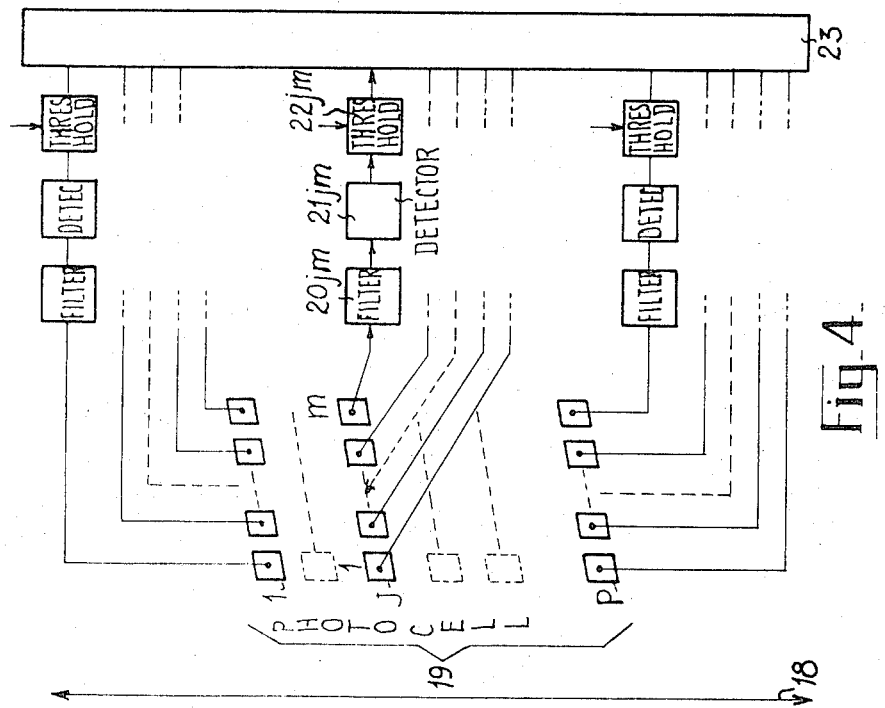
FIG. 4 is a partial schematic diagram of a pulse Doppler radar receiver showing the range Doppler distance selection channels, in which the Doppler selection arrangement includes a spectrum analyzer in accordance with the present invention; and, FIGS. 5a and 5b shows wave forms relating to the operation of a spectrum analyzer used with a pulse Doppler radar, particularly illustrating the case of a parasitic beat.
Figure 4:
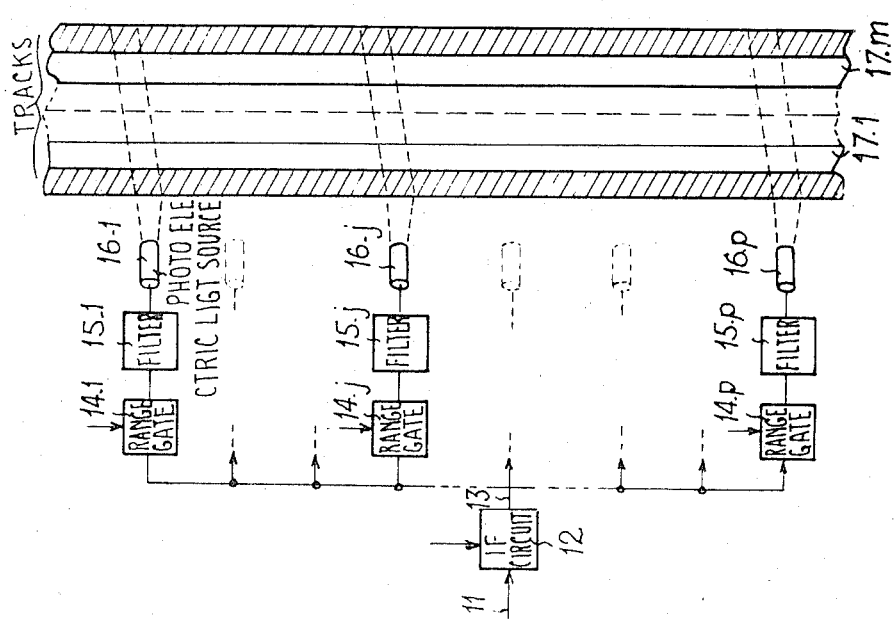

The schematic diagram of FIG. 4 represents an example of such an application and relates to the range Doppler channels assembly. It will be assumed that the incoming signal applied by output 13 to the range selection channels are preferably applied as an intermediate frequency; the system can be extended in the case of video frequency signals, but in this case the sensitivity is considerably attenuated.

The received radar signals are fed at input 11 to a mixing circuit 12, hetrodyning the signal to a predetermined intermediate frequency, which allows localizing the spectrum analysis. The output 13 feeds in parallel a plurality p of electronic distance channels. The range selection is done in a known manner by means of gating circuits 14-1, 14-j, 14-p successively enabled to the passing state by synchronization circuits (not shown). Each gating circuit is connected to a filter circuit 15-1, 15-j, 15-p for the elimination of ground-clutter echoes. These filter circuits are identical and comprise selective filters wherein the pass bandwidth corresponds to the Doppler measurement band, and which present high attenuation characteristics for frequencies located outside of this useful band, particularly for the parasitic clutter frequencies.

The Doppler selection is done with an optical correlator, as previously described. This correlator first of all comprises p electrooptic transducers 16-1, 16-j, 16-p of the photo-emissive type, corresponding to the number p of range channels, each fed by the output of a corresponding rejector filter. A moving support plan 17 has a plurality m of parallel Doppler tracks 17-1 to 17-m. The number m is determined as a function of the Doppler resolution and the Doppler measuring frequency band contemplated. By known techniques, means (not shown) are used in order to, first, on the one hand, produce an illumination of the Doppler tracks for each transducer in the form of a ray of a predetermined width, and second, on the other hand, to obtain a uniform displacement of the plan 17 at a predetermined constant speed. The other components which constitute the correlator comprise an optical objective 18, and located in the correlation plan, a mosaic 19 of electrooptical transducers of the photoreceiving diode type, which can be made in the form of several juxtapositioned linear mosaics. These diodes, totalling mp in number, are thus disposed in p lines and m columns, each column having p diodes and each line m diodes. Each column is linked in space by the optical objective lens 18 to the total illuminated zone of the corresponding track having the same order as the column, each photoreceiver of the column considered corresponding to the elementary illumination zone of said track by a photo-emissive diode of the same order as the photoreceiver. Thus, photoreceiver 19 jm (line j, column m, corresponds to range channel j, (photo-emissive diode 16j) and Doppler track 17 m.

Each photoreceiver element, such as 19 jm, feeds a Doppler filter 20 jm of the narrow band selective filter type, followed by a detector circuit 21 jm, and a threshold circuit 22 jm, for comparison in amplitude with a predetermined level. The outputs of the threshold circuits are applied to a utilization unit 23 where the signals receive a terminal treatment, such as providing display on a scope, placing in a memory, recovery of distance data, Doppler, etc.

According to the invention, the electronic and transducer circuits for each channel of the range Doppler selection are identical, particularly the Doppler filter circuits consist of filters having the same center frequency $\Delta F$ and the same frequency response characteristics. Thus, the cost of the assembly is appreciably reduced and the embodiment is simplified.

Figures 5A, 5B:
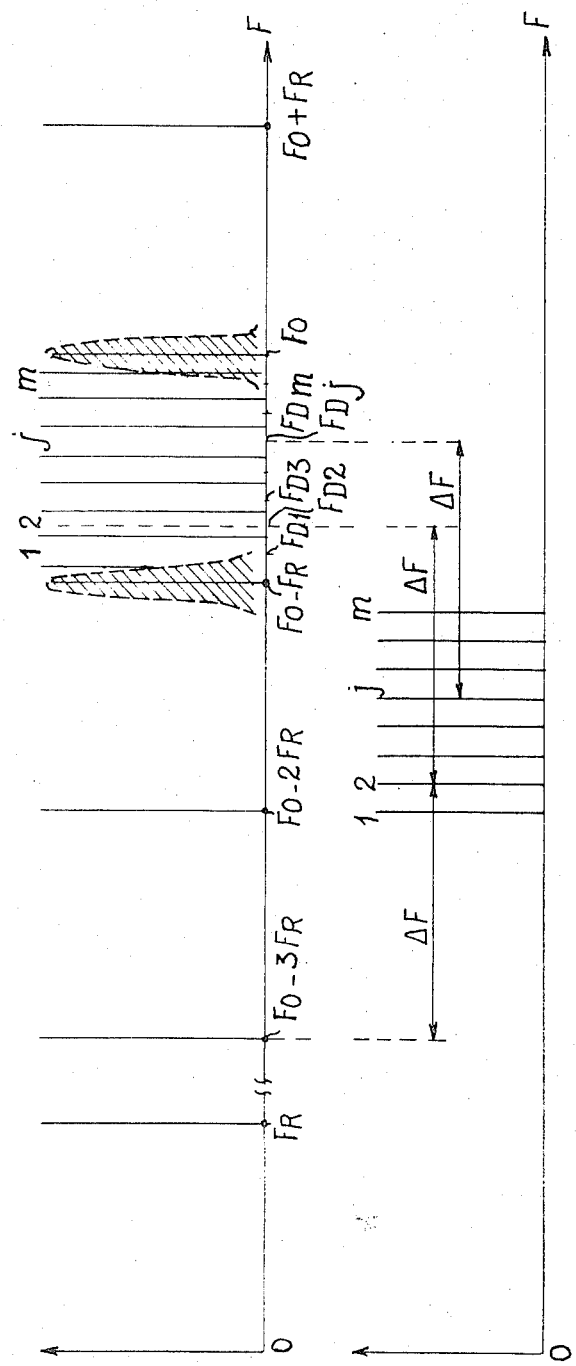

It is understood that the pulse Doppler radar is of the coherent type, which implies a pulse repetition frequency (PRF) which is an integral multiple of the pulse duration, and an intermediate frequency period, likewise an integral multiple of the repetition period. Under these conditions the reference tracks on a rotating disk or drum may be made by a continuous engraving and the spectrum of the received signal after range selection and filtering of stationary echoes is as shown in FIG. 5, line A. Rays O and $+ KF_R$ (K being an integer and $I_R$ the pulse PRF repetition frequency) shown are formed by residual ground-clutter echoes after corresponding filtering. In practice, these residues have a certain peak width caused in particular by the rotation of the aerial and the instability of the emitter. One ray corresponds to the intermediate frequency $F_o$. The rays are represented as being of the same amplitude, but it must be remembered that this depends upon the response curve of the filter for eliminating ground-clutter echoes. The Doppler frequency band analyzed can be limited advantageously in scope to a width of $(F_R/2)$ selected on one side or the other of the intermediate frequency $F_o$ and from this frequency $F_o$, so as to obtain directly the radial speed data of the mobile illuminated targets since the maximum Doppler shift ($F_R/2$) is compatible with the maximum radial speed contemplated. According to another means of utilization, the positive or negative data sign of the speed, i.e., target approaching or moving away, can be obtained by processing the signal in the presence of memory circuits placed in the utilization unit 23, and the frequency band of the spectrum to be analyzed can be considered to have a width corresponding to $F_R$, for example from $F_0$ to $F_R$, as shown. FIG. 5, line B, illustrates the frequency spectrum of the reference tracks. It can be readily shown that for one of these reference frequencies, the same frequency displacement exists for a clutter ray and a Doppler ray of Doppler sample of the same order. In the example illustrated, the displacement $\Delta F$ has been selected as being equal to $F_R + (F_R m)$. This displacement is the one which exists between each reference frequency, such as any one reference frequency $j$, and the central frequency $F_{dj}$ of the sample of the same order $j$, having a width ($E_R/m$). It is to be observed that the displacement $\Delta F$ also exists in the case illustrated in FIGS. 5a and 5b, between $F_0 - 3F_R$ and the second track reference 2. The resultant beat frequency, after correlating and filtering, produces a speed ambiguity and it is necessary either to eliminate the track corresponding to the beat frequency, or else take it into consideration when carrying out the elimination filtering of fixed echoes in such a manner as to present to the clutter spectrum centered upon the corresponding frequency ray $F_0 - 3F_R$, a higher impedance than to the other clutter frequencies.

A pulse Doppler radar system having a spectrum analyzer according to the present invention has, as compared with known systems, certain advantages notably due to the fact that the $m \times p$ Doppler filters are identical and can be made in an economical manner. The assembly is very compact and the difficulties due to sequential analysis are eliminated.

The foregoing description has been given only as an example and not in limitation, and it is understood that variations in carrying the invention into practice in accordance with the principles described are included in the inventive concept.

We claim:

1. A spectrum analyzer system using optical correlation techniques in real time with non-coherent light, comprising:
   a. transducing means for converting a signal to be analyzed into an optical modulated beam, the frequencies of said signal being included in the measuring spectrum of the spectrum analyzer;
   b. a plane support associated to moving means enabling a displacement at a constant speed, having a plurality $m$ of parallel tracks representing in the form of variable transparency $m$ different frequencies at the rate of one frequency per track, the value of said frequencies being determined by displacing said measuring spectrum (F1-F2) by a predetermined frequency value ($\Delta F$), dividing said frequency displaced measuring spectrum into $m$ successive elementary frequency bands having a common frequency bandwidth value, selecting central frequencies of said elementary frequency bands to constitute said respective track frequencies, so as to provide by correlation between said track frequencies and corresponding respective central frequencies of said measuring spectrum a beat-frequency equal to said frequency displacement value ($\Delta F$);
   c. a plurality $m$ of photoreceivers in the correlation plane optically associated respectively to said m tracks, each feeding a selective filter, said filters being identical, each having a central frequency equal to said beat frequency ($\Delta F$) and a maximal frequency bandwidth equal to said common frequency bandwidth value of said elementary frequency bands; and,
   d. a utilization unit fed by detection circuits following said filters, and enabling analog processing.

2. A system as claimed in claim 1, including a threshold circuit interposed between each of said detection circuits and said utilization unit for digital processing.

3. A system as claimed in claim 1, wherein the signal to be analyzed is an electrical signal having a spectrum band width corresponding to that of the system band width capabilities, said signal is fed to an electro-optical transducer including an electroluminescent diode as well as optical means so as to produce a pencil beam illuminating said tracks, said photocells comprising a row of m photodiodes.

4. A system as claimed in claim 2, wherein said system is used for the Doppler selection in a pulse Doppler radar receiver, wherein said transducer means includes a plurality $p$ of electroluminescent diodes, each corresponding to a range channel, a mosaic pattern comprising a plurality mp of photocell receiver elements, and associated $mp$ electronic circuits disposed along said mosaic pattern, said receiver elements along each line corresponding m Doppler channels.

5. A system as claimed in claim 4, including:
   a. electronic gating and filtering circuits for range selection and ground-clutter rejection, having a plurality $p$ of channels fed in parallel by the received signal, each channel having in series a gate and a filter circuit, the output of which feeding corresponding electroluminescent diode; and,
   b. Doppler selection circuits using optical correlation, including a plurality of tracks corresponding to a determined sampled Doppler spectrum displaced in frequency of a determined value $\Delta F$ so as to produce a plurality of $m$ channels regularly spaced in a band width less than the pulse repetition frequency.

* * * * *